(No Model.)
D. S. WILLIAMS.
ELECTRICAL BATTERY.
No. 552,219. Patented Dec. 31, 1895.
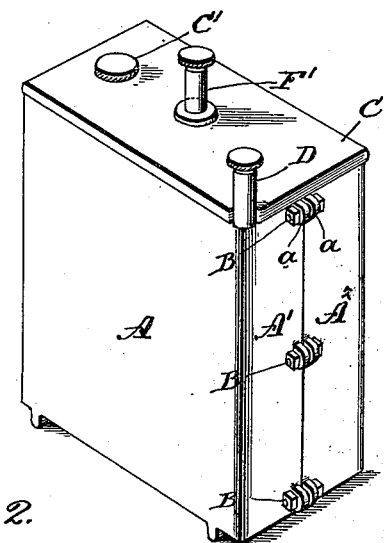
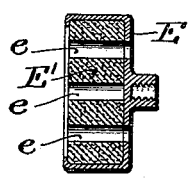
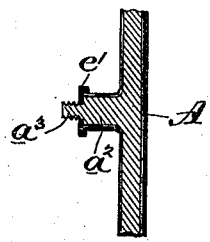
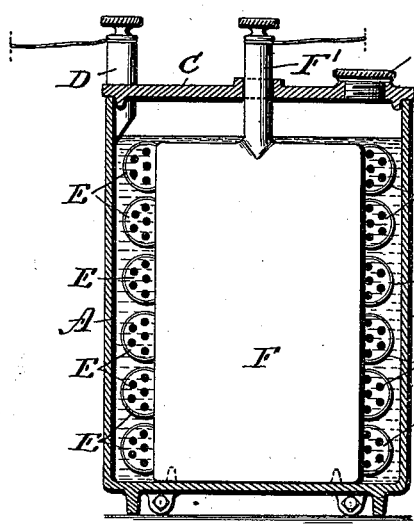
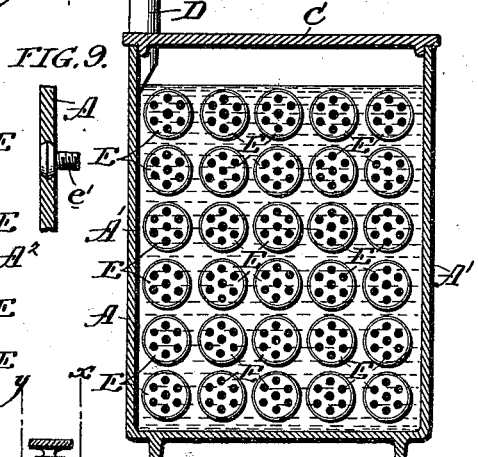
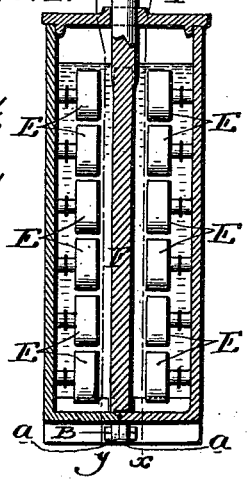
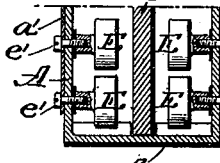
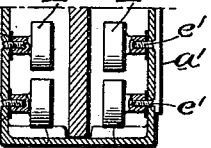
Witnesses.
Philip Bouteljé
Maurice F. Ellis
Inventor.
David S. Williams
ANDREW B. GRAHAM, PHOTO-LITHO, WASHINGTON, D.C.

UNITED STATES PATENT OFFICE.

DAVID S. WILLIAMS, OF PHILADELPHIA, PENNSYLVANIA.

ELECTRICAL BATTERY.

SPECIFICATION forming part of Letters Patent No. 552,219, dated December 31, 1895.

Application filed August 23, 1895. Serial No. 560,212. (No model.)

*To all whom it may concern:*

Be it known that I, DAVID S. WILLIAMS, a citizen of the United States, residing at Philadelphia, county of Philadelphia, and State of Pennsylvania, have invented a new and useful Improvement in Electrical Batteries, of which the following is a full, clear, and exact description, reference being had to the accompanying drawings, which form a part of this specification.

My invention relates to certain improvements in electric batteries of the primary type, and has for its object to construct a cell in which a single positive electrode is employed in connection with a large number of separate blocks forming a negative electrode, the arrangement and disposition of the two elements being such that the efficiency and life of the battery will be materially increased.

In the accompanying drawings, Figure 1 is a perspective view of a primary battery constructed in accordance with my invention. Fig. 2 is a sectional elevation of the same on the line $x\ x$, Fig. 4. Fig. 3 is a similar view on the line $y\ y$, Fig. 4. Fig. 4 is a transverse sectional elevation of the battery on the line $z\ z$, Fig. 2. Fig. 5 is a sectional elevation on an enlarged scale of one of the sections of the cathode and its holding-cup. Fig. 6 is a similar view of a portion of the battery, illustrating the holding-screw for securing the cathode-cup in position; and Figs. 7, 8, and 9 are sectional views illustrating modified constructions of the cup-holding devices.

The cup or cell A is preferably made of sheet or cast iron and is formed in two sections $A'\ A^2$, each having lugs $a$ for the reception of securing-bolts B. The meeting edges of the sections may have suitable grooves for packing, so that when the bolts are tightened the jar will be perfectly water-tight.

The inner surface of each of the sections $A'\ A^2$ is coated with porcelain or agate or other non-conductor to avoid any danger of short-circuiting, and the removable cover C is likewise coated with similar material. In the cover C is formed a threaded opening closed by a removable plug $C'$ for convenience in filling the cell with the electrolyte.

From the inner surface of each of the sections $A'\ A^2$ project lugs $a^2$, threaded at $a^3$ for the reception of a threaded socket formed on the rear face of each of the cathode-cups E. These cathode-cups E are formed of conducting material, and as each is separately screwed on one of the lugs $a^2$ all of the blocks or sections of the cathode are connected together by the iron forming the cell or casing, the casing as a whole forming the cathode and being provided with a connecting-post D, to which one of the conducting-wires may be attached.

The blocks $E'$ into which the cathode is divided are preferably formed of a high oxide of lead and are provided with openings $e$, which extend through the block and its holding-cup to permit the free passage of the electrolyte.

In order to prevent any exposure of the iron to the electrolyte which might occur at the threaded ends of the lugs $a^2$, I preferably place a small rubber disk or cup $e^2$ over the threaded end of each lug and then screw the cathode-holding cups in place.

The positive electrode or anode F, having a connecting-post $F'$, is in the form of a broad thick plate of zinc placed centrally between the sections of the cathode, so that a very large surface area is afforded for the action of the battery and the efficiency of the battery materially increased.

In Fig. 7 I have illustrated a modified structure in which the casing A is made in one piece of conducting or non-conducting material, as may be desired, and the various cathode-holding cups E are supported by separate screws $e'$, passing through the casing and electrically connected to a conducting-strip $a'$, which leads to the connecting-post. In Fig. 8 is illustrated a similar structure, save that the screws $e'$ are here formed integral with the conducting-strips $a'$.

In Fig. 9 I have shown a modification in which the screw $e'$ is provided with a double dovetailed base $e^3$, which may be cast or otherwise secured in the battery-casing A.

Having thus described my invention, what I claim, and desire to secure by Letters Patent, is—

1. In an electric battery the combination of the two-part casing having threaded lugs $a^2$, cathode holding cups E, adapted to be secured thereto, cathodes $E'$ in said cups, and an anode F located between the two parts of the casing in said cell, substantially as specified.

2. An improved battery comprising essentially a casing of electrical conductive material, containing an electrolyte the inner surface of said casing being of non-conductive material, a series of cathodes secured to opposite sides of said casing and in connection with the conductive portion of said casing, and an anode between the cathodes of opposite sides of the casing.

3. An improved battery comprising essentially a casing of electrical conductive material, containing an electrolyte, the inner surface of said casing being of non-conductive material, a series of cathodes removably secured to opposite sides of said case and in connection with the conductive portion of said case.

4. An improved battery consisting of a casing of electric conductive material, containing an electrolyte, the inner surface of said casing being of non-conductive material, a series of cathodes secured to said case and in connection with the conductive portion of said case.

5. An improved battery consisting of a casing containing an electrolyte, a series of cathodes in said electrolyte, conductive material having an insulated surface in contact with said electrolyte, the cathodes being in electrical connection with said conductive material.

6. The combination in a battery, of a cell or casing formed in two parts, and a cathode, supported thereby, and an anode located between the two parts of the casing situated in said cell.

In testimony of which invention I have hereunto set my hand.

DAVID S. WILLIAMS.

Witnesses:
GEO. W. REED,
PHILIP BOUTELJE.